United States Patent
Mahajan et al.

(10) Patent No.: US 11,082,302 B2
(45) Date of Patent: Aug. 3, 2021

(54) SYSTEM AND METHOD FACILITATING REUSABILITY OF DISTRIBUTED COMPUTING PIPELINES

(71) Applicant: Impetus Technologies, Inc., Los Gatos, CA (US)

(72) Inventors: Aashu Mahajan, Los Gatos, CA (US); Pravin Agrawal, Indore (IN); Punit Shah, Los Gatos, CA (US); Rakesh Kumar Rakshit, Indore (IN); Saurabh Dutta, Indore (IN); Sumit Sharma, Los Gatos, CA (US); Ankit Jain, Los Gatos, CA (US)

(73) Assignee: IMPETUS TECHNOLOGIES, INC., Los Gatos, CA (US)

( * ) Notice: Subject to any disclaimer, the term of this patent is extended or adjusted under 35 U.S.C. 154(b) by 59 days.

(21) Appl. No.: 15/380,393

(22) Filed: Dec. 15, 2016

(65) Prior Publication Data
US 2017/0099193 A1   Apr. 6, 2017

Related U.S. Application Data

(63) Continuation of application No. 14/859,503, filed on Sep. 21, 2015.
(Continued)

(51) Int. Cl.
*H04L 12/24* (2006.01)
*G06F 3/0486* (2013.01)
*H04L 29/06* (2006.01)

(52) U.S. Cl.
CPC ............ *H04L 41/22* (2013.01); *G06F 3/0486* (2013.01); *H04L 65/80* (2013.01)

(58) Field of Classification Search
CPC ........ H04L 41/22; H04L 65/80; G06F 3/0486
(Continued)

(56) References Cited

U.S. PATENT DOCUMENTS

| 7,020,697 B1 | 3/2006 | Tor Mesoy et al. |
| 7,529,764 B2 | 5/2009 | Gutsche |

(Continued)

FOREIGN PATENT DOCUMENTS

| WO | 2004015897 A2 | 2/2004 |

OTHER PUBLICATIONS

David K. Brown, Thommas M. Musyoka, David L. Penkler and Özlem Tastan Bishop, "JMS: A workflow management system and web-based cluster front-end for the Torque resource manager", 7 pages, Research Unit in Bioinformatics (RUBi), Department of Biochemistry & Microbiology, Rhodes University, Grahamstown, South Africa, Aug. 17, 2015.
(Continued)

*Primary Examiner* — Stephen S Hong
*Assistant Examiner* — Broderick C Anderson
(74) *Attorney, Agent, or Firm* — Hayes Soloway P.C.

(57) ABSTRACT

A system and method for facilitating reusability of distributed computing pipelines, initially, captures the distributed computing pipeline designed over a Graphical User Interface (GUI) of a first data processing environment associated with a stream analytics platform. Subsequent to the designing, the distributed computing pipeline may be stored in a repository. The distributed computing pipeline may be stored in a file with a predefined file format pertaining to the stream analytics platform. The system also maintains a repository of different versions of the distributed computing pipeline created by the first and second user. Upon storing the file, the file may be imported in a second data processing environment. After importing the file, the distributed com-
(Continued)

puting pipeline may be populated over the GUI of the second data processing environment, thereby facilitating reusability of the distributed computing pipeline.

15 Claims, 8 Drawing Sheets

Related U.S. Application Data

(60) Provisional application No. 62/267,436, filed on Dec. 15, 2015, provisional application No. 62/052,668, filed on Sep. 19, 2014.

(58) Field of Classification Search
USPC .......................................................... 715/738
See application file for complete search history.

(56) References Cited

U.S. PATENT DOCUMENTS

| | | | |
|---|---|---|---|
| 9,501,377 B2 | 11/2016 | Greene et al. | |
| 2002/0069224 A1* | 6/2002 | Asai | G06F 16/88 |
| | | | 715/239 |
| 2005/0097441 A1* | 5/2005 | Herbach | G06F 21/10 |
| | | | 715/229 |
| 2005/0149543 A1* | 7/2005 | Cohen | G06F 17/30297 |
| 2006/0123016 A1* | 6/2006 | Ashok | H04L 41/0803 |
| 2007/0174383 A1* | 7/2007 | Denoix | G06Q 10/10 |
| | | | 709/200 |
| 2009/0106403 A1* | 4/2009 | McGee | G06F 9/44505 |
| | | | 709/221 |
| 2009/0222506 A1* | 9/2009 | Jeffery | G06F 11/3404 |
| | | | 709/202 |
| 2013/0227573 A1* | 8/2013 | Morsi | G06F 9/5083 |
| | | | 718/100 |
| 2015/0215390 A1* | 7/2015 | Yerli | G06F 3/0484 |
| | | | 715/753 |

OTHER PUBLICATIONS

Ivo D. Dinov, John D. Van Horn, Kamen M. Lozev, Rico Magsipoc, Petros Petrosyan, Zhizhong Liu, Allan Mackenzie-Graham, Paul Eggert, Douglas S. Parker, and Arthur W. Toga, "Efficient, Distributed and Interactive Neuroimaging Data Analysis Using the LONI Pipeline", (Forentiers in Neuroinformatics), Jul. 20, 2009, 12 pages, USA.

* cited by examiner

# SYSTEM AND METHOD FACILITATING REUSABILITY OF DISTRIBUTED COMPUTING PIPELINES

CROSS-REFERENCE TO RELATED APPLICATIONS

The application is a continuation-in-part of U.S. patent application Ser. No. 14/859,503, entitled, "REAL TIME STREAMING ANALYTICS PLATFORM" filed on Sep. 21, 2015, which claims priority to U.S. Provisional Application No. 62/052,668, entitled, "REAL TIME STREAMING ANALYTICS PLATFORM" filed on Sep. 19, 2014, and this application claims benefit of U.S. Provisional Application No. 62/267,436, entitled, "SYSTEM AND METHOD FACILITATING REUSABILITY OF DISTRIBUTED COMPUTING PIPELINES" filed on Dec. 15, 2015, the entire disclosures of which are incorporated herein by reference.

TECHNICAL FIELD

The present disclosure described herein, in general, relates to distributed computing, and more particularly to a system and method facilitating reusability of distributed computing pipelines.

BACKGROUND

Typically, operation of a stream analytics platform is enabled through a distributed computing pipeline containing multiple channel components and processor components. It must be noted that each channel component and each processor component are designated to perform specific functions or tasks that need to be executed in real-time data processing. Typically, the functionalities or tasks associated with each component are executed by a cluster of computing resources in the Apache® Storm® engine. It is to be noted that these components are available on a graphical user interface (GUI) for designing the distributed computing pipeline. A user may drag and drop the components on a workspace of the GUI in order to design the distributed computing pipeline. In one example, the distributed computing pipeline may be designed as per the method(s) described in the pending U.S. patent application Ser. No. 14/859,503, incorporated herein as a reference. The distributed computing pipeline so designed may then be executed by the cluster of computing resources belonging to the Apache® Storm® engine.

In order to design the distributed computing pipeline, the user needs to identify and select individual components including the channels (from where the big data sets are streamed), the processors (which execute the business logic in distributed way), the an analytical component (which analyzes the data in real-time), and the emitters (which finally emit the processed data to other data sources). Further, the user needs to create all the metadata, distributed computation logic, analytics metadata. Additionally, the user needs to create message groups in which the user configures the persistence properties like table-name, index-name, whether compression is to be enabled, pre-creation of partitions for the persistence store, whether to enable full-text search in indexing store, whether to enable custom routing, specify the number of shards and replication in index store. Further, the user needs to create message which defines the structure of the records flowing as streams in the real-time processing pipeline. The user needs to re-create all the message fields and field level configurations like fieldname, field label, field alias, field data-type, field indexing behavior and field persistence behavior in order to design the distributed computing pipeline.

After creation of the pipeline in a pre-production environment, the user further needs to run the pipeline and test the pipeline with big data sets to ensure that the desired results are obtained. In the existing art, every time the user creates a new pipeline, the user needs to repeat the aforementioned steps. More specifically, while creating the new pipeline, the user needs to create the pipeline from scratch and re-create all the metadata, the computation components, the distributed computation logic, the analytics metadata and re-test the newly created pipeline for similar outputs as tested in the pre-production environment. The user may further needs to re-create the message group, the message, and reconfigure the message fields. It is to be noted that the re-creation of the pipeline from scratch is an onerous, tedious and time consuming process. This is because the components and the fields to be configured for generating the distributed processing pipeline may be large in number. Further, while creating the distributed computing pipeline, if the user has made any mistake which is detected during the testing of the distributed computing pipeline, then the user has to reconfigure and retest each channel and processor component to produce the desired results.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related system and method for facilitating reusability of distributed computing pipelines and the concepts are further described below in the detailed description. This summary is not intended to identify essential features of the claimed subject matter nor is it intended for use in determining or limiting the scope of the claimed subject matter.

In one implementation, a method for facilitating reusability of distributed computing pipelines is disclosed. Initially, a processor is configured to capture a distributed computing pipeline designed by a first user, over a Graphical User Interface (GUI) of a first data processing environment associated with a stream analytics platform. In one aspect, the distributed computing pipeline may comprise a subset of component, and a set of links corresponding to the subset of component. In one aspect the subset of component may be selected by the first user of the data processing environment from a universal set of components of the stream analytics platform. Once the distributed computing pipeline is captured, the processor is configured to store the distributed computing pipeline in a repository. In one aspect, the distributed computing pipeline may be stored in a file with a predefined file format. The predefined file format may be determined based on the stream analytics platform. Upon storing the file, the processor is configured to import the file in a second data processing environment. After importing the file, the processor is configured to populate the distributed computing pipeline over the GUI of the second data processing environment, thereby facilitating a second user of the second data processing environment to reuse the distributed computing pipeline.

In another implementation, a system for facilitating reusability of distributed computing pipelines is disclosed. The system may comprise a processor and a memory coupled to the processor. The processor may execute a plurality of modules present in the memory. The plurality of modules may comprise a designing module, an export module, an import module, and a populating module. The pipeline designing module may capture a distributed computing pipeline designed by a first user, over a Graphical User Interface (GUI) of a first data processing environment associated with a stream analytics platform. In one aspect, the distributed computing pipeline may comprise a subset of component, and a set of links corresponding to the subset of component. In one aspect the subset of component may be selected by the first user of the data processing environment from a universal set of components of the stream analytics platform. Once the distributed computing pipeline is captured, the export module may store the distributed computing pipeline in a repository. In one aspect, the export module may store the distributed computing pipeline in a file with a predefined file format. The predefined file format may be determined based on the stream analytics platform. Subsequent to the export of the distributed computing pipeline in a file, the import module may import the file in a second data processing environment. Upon importing the file, the populating module may populate the distributed computing pipeline over the GUI of the second data processing environment, thereby facilitating a second user of the second data processing environment to reuse the distributed computing pipeline.

In yet another implementation, non-transitory computer readable medium embodying a program executable in a computing device for facilitating reusability of distributed computing pipelines is disclosed. The program may comprise a program code for capturing a distributed computing pipeline designed by a first user, over a Graphical User Interface (GUI) of a first data processing environment associated with a stream analytics platform. In one aspect, the distributed computing pipeline may comprise a subset of component, and a set of links corresponding to the subset of component. In one aspect the subset of component may be selected by the first user of the data processing environment from a universal set of components of the stream analytics platform. The program may further comprise a program code for storing the distributed computing pipeline in a repository, wherein the distributed computing pipeline is stored in a file with a predefined file format. The predefined file format may be determined based on the stream analytics platform. The program may further comprise a program code for importing the file in a second data processing environment. The program may further comprise a program code for populating the distributed computing pipeline over the GUI of the second data processing environment, thereby facilitating a second user of the second data processing environment to reuse the distributed computing pipeline.

BRIEF DESCRIPTION OF THE DRAWINGS

The foregoing detailed description of embodiments is better understood when read in conjunction with the appended drawings. For the purpose of illustrating the disclosure, example constructions of the disclosure is shown in the present document. However, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
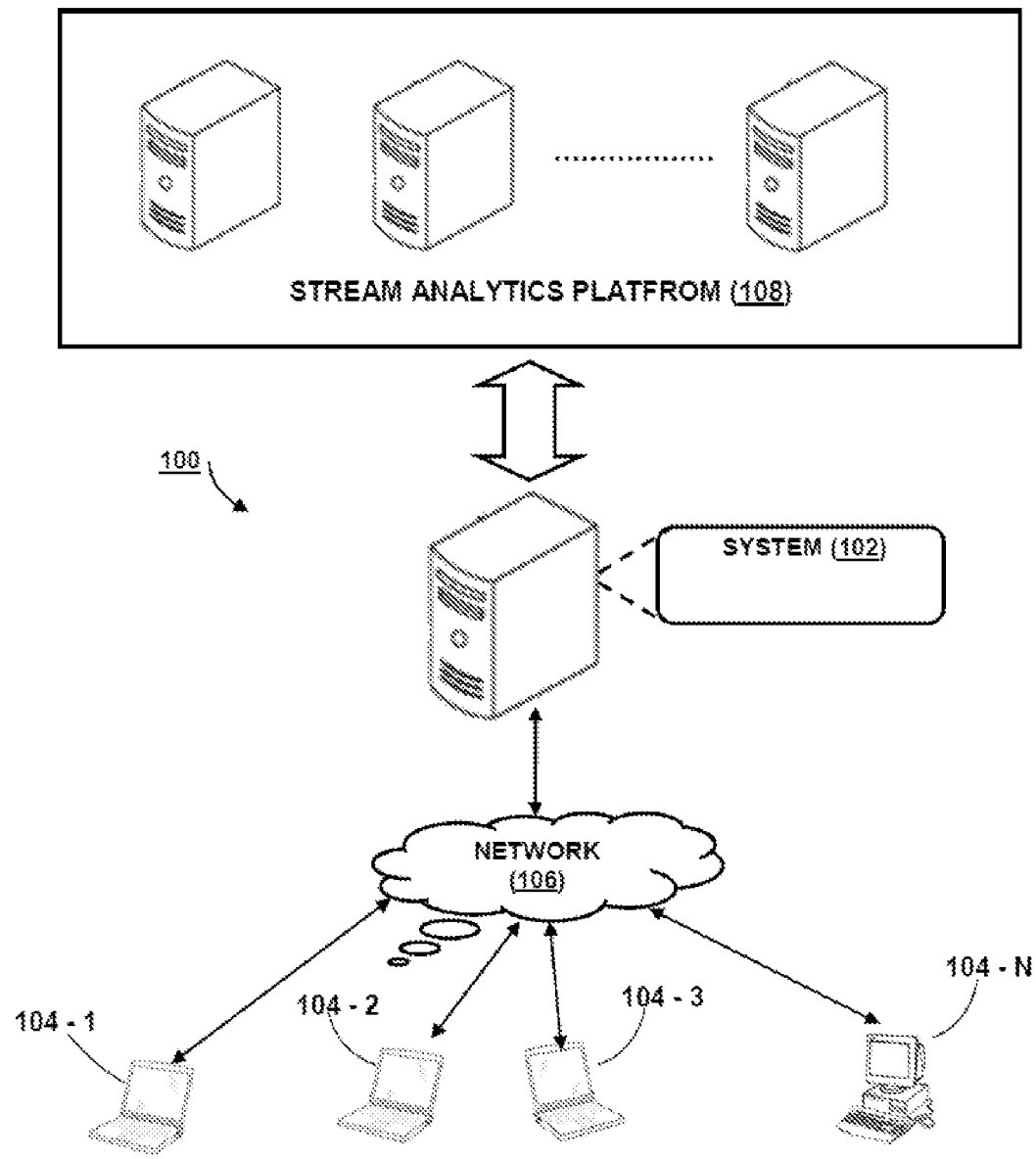
FIG. 1 illustrates a network implementation of a system for facilitating reusability of distributed computing pipelines, in accordance with an embodiment of the present subject matter.

Some embodiments of this disclosure, illustrating all its features, will now be discussed in detail. The words "capturing", "storing", "importing", and "populating" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

According to various aspects of present disclosure, the system and method is disclosed for facilitating reusability of distributed computing pipelines. In one embodiment, a distributed computing pipeline may be designed and tested in a pre-production environment. The system facilitates storing a distributed computing pipeline (also referred hereinafter as "pipeline" interchangeably) along with all the configurations associated therewith the pipeline, in a repository. The present disclosure further facilitates importing the pipeline in a production environment. The present disclosure mitigates the need of re-create the pipeline to be used in the production environment by re-using the same pipeline created and tested in the pre-production environment. In accordance with an embodiment of the present disclosure, the pipeline being exported from the pre-production environment is saved as a file which is imported in the production environment. The file acts as a blueprint for creation of exactly similar pipeline in the production environment. The user may then start working on the imported pipeline with minimum development efforts.

According to one embodiment of the present disclosure, the system facilitates reusability of pipeline by creating a set of versions of the same pipelines. For instance, if the user has created a first version of a pipeline containing five components, the user may save the first version and create a second version of the same pipeline with additional new components. While working on the second version, if there is any mistake/error introduced by the user, the user may anytime revert and start working on the first version having five components.

Referring now to FIG. 1, a network implementation 100 of a system 102 for facilitating reusability of distributed computing pipelines is disclosed. In order to facilitate reusability of the distributed computing pipelines, initially, the system 102 may capture a distributed computing pipeline designed by a first user, over a Graphical User Interface (GUI) of a first data processing environment associated with a stream analytics platform. In one aspect, the distributed computing pipeline may comprise a subset of component and a set of links corresponding to the subset of component. In one aspect, the subset of component may be selected by the first user of the data processing environment from a universal set of components of the stream analytics platform. Subsequent to the designing of the distributed computing pipeline, the system 102 may store the distributed computing pipeline in a repository. In one aspect, the system 102 may store the distributed computing pipeline in a file. The file may be stored in a predefined file format associated with the stream analytics platform. Upon storing the file, the system 102 may be configured to import the file in a second data processing environment. Subsequent to the import of the file, the system 102 may populate the distributed computing pipeline over the GUI of the second data processing environment, thereby facilitating a second user of the second data processing environment to reuse the distributed computing pipeline.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. The system 102 is coupled to a stream analytics platform 108 implemented over at least one of an Apache® Storm® engine or an Apache® Spark® engine (also referred hereinafter as "storm" or "storm cluster" interchangeably) containing multiple computing machines. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
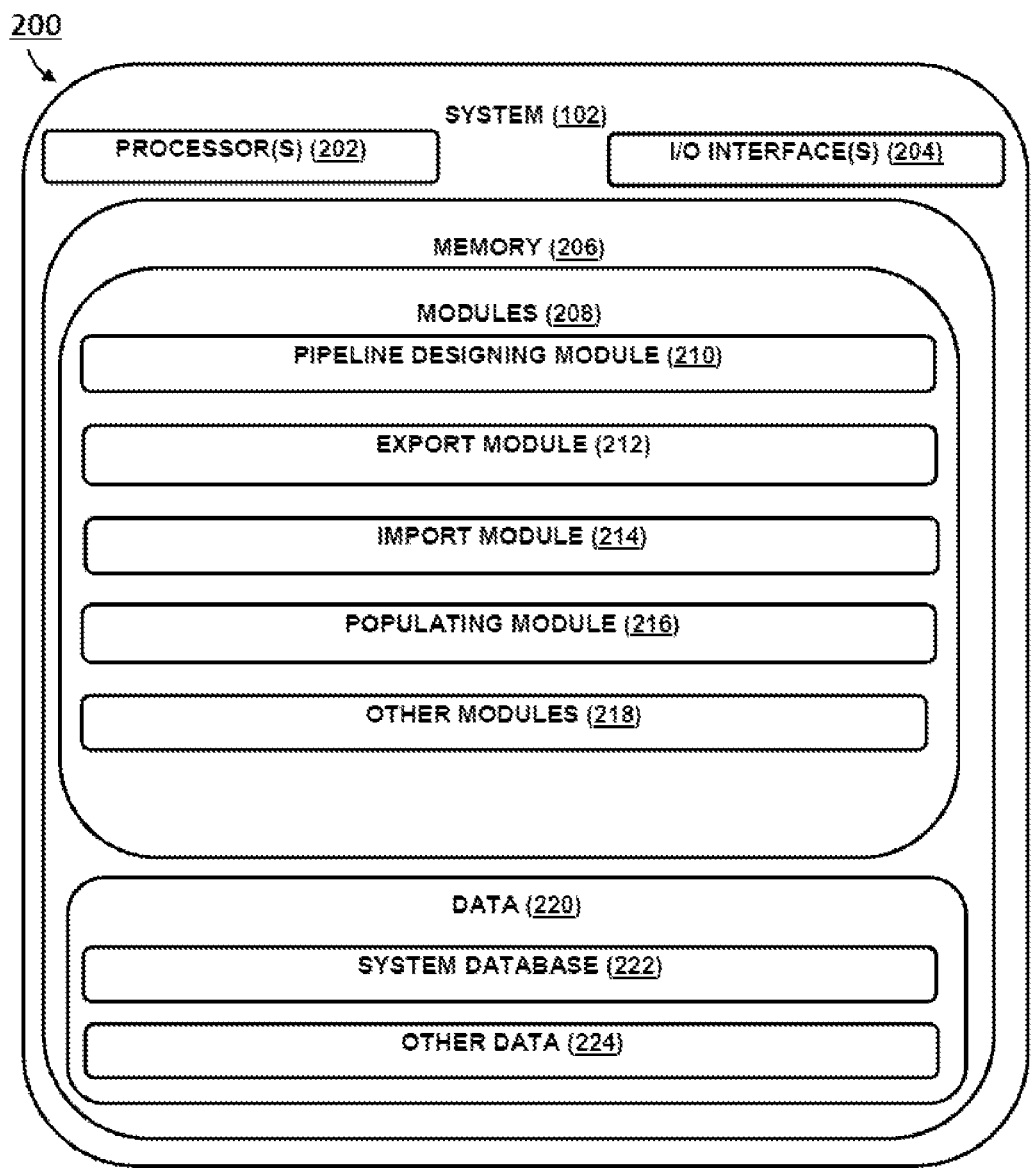
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 222.

The modules 208 include routines, programs, objects, components, data structures, etc., which perform particular tasks or implement particular abstract data types. In one implementation, the modules 208 may include a pipeline designing module 210, an export module 212, an import module 214, and a populating module 216, and other modules 218. The other modules 218 may include programs or coded instructions that supplement applications and functions of the system 102. The modules 208 described herein may be implemented as software modules that may be executed in the cloud-based computing environment of the system 102.

The data 220, amongst other things, serves as a repository for storing data processed, received, and generated by one or more of the modules 208. The data 220 may also include a system database 222 and other data 224. The other data 224 may include data generated as a result of the execution of one or more modules in the other modules 218.

In order to facilitate reusability of distributed computing pipelines, at first, a user may use the client device 104 to access the system 102 via the I/O interface 204. The user may register to the system 102 using the I/O interface 204 in order to use the system 102. The system 102 may employ the pipeline designing module 210, the export module 212, the import module 214, the populating module 216, and other modules 218 for facilitating reusability of distributed computing pipelines.

In one embodiment, the pipeline designing module 210 is configured to enable a first user for designing a distributed computing pipeline (hereinafter also referred as "pipeline" or "graphical pipeline") over a Graphical User Interface (GUI) of a first data processing environment of a stream analytics platform. The distributed computing pipeline may comprise a subset of component selected from a universal set of components and a set of links corresponding to the subset of component. In one aspect, the pipeline designing module 210 may enable the first user of the first data processing environment to select the subset of component from the universal set of components of the stream analytics platform. The subset of components may comprise at least one of a channel component, a processor component, an analytical component and an emitter component. In one aspect, the GUI may comprise at least a canvas and a palette, wherein the palette is configured to display the universal set of components of the stream analytics platform, and wherein the pipeline designing module 210 may enable the first user to drag and drop one or more components over the canvas from the universal set of components of the stream analytics platform for generating the distributed computing pipeline. In one embodiment, the pipeline designing module 210 may enable the first user to update one or more components of the distributed computing pipeline in order to generate one or more versions corresponding to the distributed computing pipeline in the stream analytics platform.

Once the pipeline is designed, in the next step, the export module 212 may store the distributed computing pipeline in a repository. In one aspect, the export module 212 may store the distributed computing pipeline in a file with a predefined file format pertaining to the stream analytics platform. In one aspect, the export module 212 may store the file in the system database 222. In one aspect, the export module 212 may configure the file to maintain a name, a structure, messages, message groups, alerts, agent configurations, transformation variables, registered components, scope variables, and user defined functions pertaining to the distributed computing pipeline.

In one embodiment, the export module 212 may maintain the different versions of the pipeline into a particular directory structure. For each version of the pipeline, a folder may be created in the system database 222 of the system 102, wherein the folder is capable of storing the pipeline and metadata associated with the each version of the pipeline. The export module 212 may identify each folder based on unique name and unique version number. Each folder may store the pipeline definition in the predefined file format. It is to be understood that the file may maintain a manner in which the one or more of the components of the distributed computing pipeline are linked to each other. In one aspect, the predefined file format is JSON (JavaScript Object Notation) format. The export module 212 may bundle the channel components, the alerts, the messages, the registered components for each version of the pipeline together to form the file with the JSON format. In one aspect, the export module 212 may store the file with the JSON format along with custom Java Archive (JAR) files, related to custom components in the pipeline, in the folder specified for the particular version. In one aspect, the export module 212 may create multiple folders for each version of the pipeline storing the file in the JSON format and the custom JAR files. In one embodiment, the export module 212 may provide an "export" option to the first user of the first data processing environment to export the pipeline from the first data processing environment and store the pipeline in the system database 222.

In one embodiment, the import module 214 may import the file in a second data processing environment. In one embodiment, the file may be communicated to the second user, of the second distributed processing environment, from the first user by using at least one communication medium. The communication medium includes, but not limited to, email, SMS, Bluetooth, NFC, Li-Fi, and Wi-Fi, and alike. The import module 214 may also be configured to verify the file format of the file stored in the system database 222. In one aspect, the import module 214 may only import the file when the file format is compatible with the stream analytics platform. In one embodiment, the import module 214 may further be configured to retrieve the different versions of the pipeline from the folder stored in the system database 222. Though the multiple versions of the pipeline may be stored in the file system, the latest version or the current version on which the user 104 is working currently may be stored in the system database 222. In one embodiment, the import module 214 may provide an "import" option to the first and second user of the data processing environment to import the file from the system database 222.

Once the file is imported into the second data processing environment, the populating module 216 may populate the distributed computing pipeline over the GUI of the second data processing environment, thereby facilitating the second user of the second data processing environment to reuse the distributed computing pipeline. In one embodiment, the populating module 216 may enable the second user to update the one or more components of the distributed computing pipeline to generate one or more versions corresponding to the distributed computing pipeline. In one aspect, if the second data processing environment has conflict with the file imported from the system database 222, the populating module 216 may generate a warning message. In one aspect, the warning message may be displayed to the second user seeking conformation to update existing information in the pipeline being imported. In one aspect, the populating module 216 may populate the distributed computing pipeline over at least one of a monitor, a display screen, a mobile display and alike.

Figure 3:
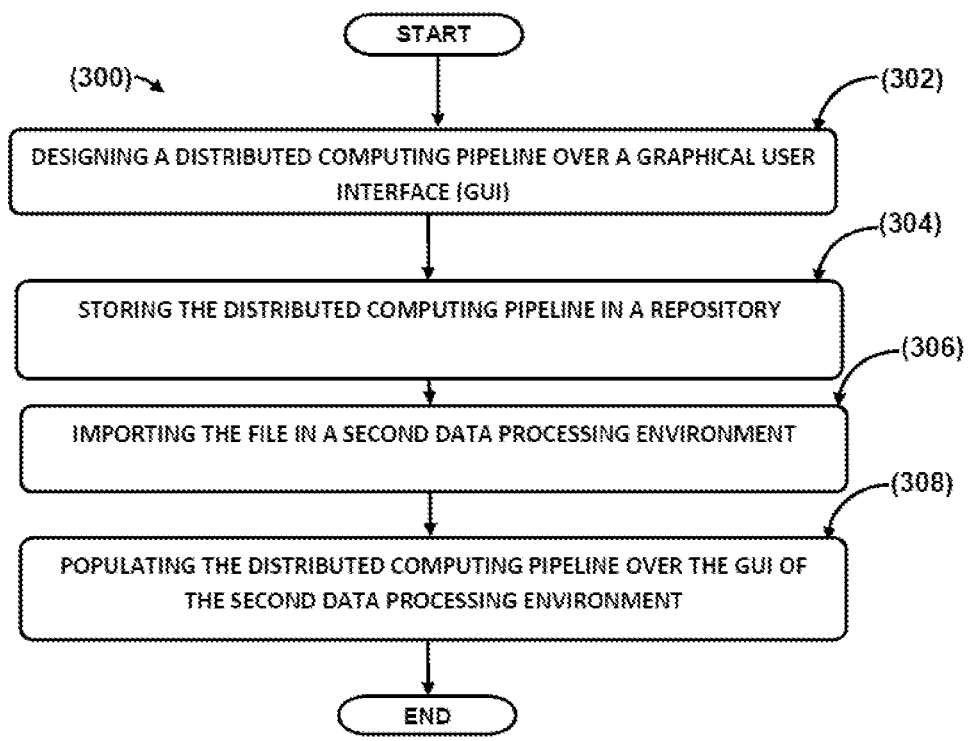
FIG. 3 illustrates a flow graph corresponding to the method for facilitating reusability of distributed computing pipelines, in accordance with an embodiment of the present subject matter.

Referring now to FIG. 3, a method 300 for facilitating reusability of distributed computing pipelines is disclosed, in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the pipeline designing module 210 is configured to enable a first user for designing a distributed computing pipeline (hereinafter also referred as "pipeline" or "graphical pipeline") over a Graphical User Interface (GUI) of a first data processing environment of a stream analytics platform. The distributed computing pipeline may comprise a subset of component selected from a universal set of components and a set of links corresponding to the subset of component. In one aspect, the pipeline designing module 210 may enable the first user of the first data processing environment to select the subset of component from the universal set of components of the stream analytics platform. The subset of components may comprise at least one of a channel component, a processor component, an analytical component and an emitter component. In one aspect, the GUI may comprise at least a canvas and a palette, wherein the palette is configured to display the universal set of components of the stream analytics platform, and wherein the pipeline designing module 210 may enable the first user to drag and drop one or more components over the canvas from the universal set of components of the stream analytics platform for generating the distributed computing pipeline. In one embodiment, the pipeline designing module 210 may enable the first user to update one or more components of the distributed computing pipeline in order to generate one or more versions corresponding to the distributed computing pipeline in the stream analytics platform.

At block 304, once the pipeline is designed, in the next step, the export module 212 may maintain the different versions of the pipeline into a particular directory structure. For each version of the pipeline, a folder may be created in the system database 222 of the system 102, wherein the folder is capable of storing the pipeline and metadata associated with the each version of the pipeline. The export module 212 may identify each folder based on unique name and unique version number. Each folder may store the pipeline definition in the predefined file format. It is to be understood that the file may maintain a manner in which the one or more of the components of the distributed computing pipeline are linked to each other. In one aspect, the predefined file format is JSON (JavaScript Object Notation) format. The export module 212 may bundle the channel components, the alerts, the messages, the registered components for each version of the pipeline together to form the file with the JSON format. In one aspect, the export module 212 may store the file with the JSON format along with custom Java Archive (JAR) files, related to custom components in the pipeline, in the folder specified for the particular version. In one aspect, the export module 212 may create multiple folders for each version of the pipeline storing the file in the JSON format and the custom JAR files. In one embodiment, the export module 212 may provide an "export" option to the first user of the first data processing environment to export the pipeline from the first data processing environment and store the pipeline in the system database 222.

At block 306, the import module 214 may import the file in a second data processing environment. In one embodiment, the file may be communicated to the second user of the second distributed processing environment from the first user by using at least one communication medium. The communication medium includes, but not limited to, email, SMS, Bluetooth, NFC, Li-Fi, and Wi-Fi, and alike. The import module 214 may also be configured to verify the file format of the file stored in the system database 222 of the system 102. In one aspect, the import module 214 may only import the file when the file format is compatible with the stream analytics platform. In one embodiment, the import module 214 may further be configured to retrieve the different versions of the pipeline from the folder stored in the system database 222. Though the multiple versions of the pipeline may be stored in the file system, the latest version or the current version on which the user 104 is working currently may be stored in the system database 222. In one embodiment, the import module 214 may provide an "import" option to the first and second user of the data processing environment to import the file from the system database 222.

At block 308, the populating module 216 may populate the distributed computing pipeline over the GUI of the second data processing environment, thereby facilitating a second user of the second data processing environment to reuse the distributed computing pipeline. In one embodiment, the populating module 216 may enable the second user to update the one or more components of the distributed computing pipeline to generate one or more versions corresponding to the distributed computing pipeline. In one aspect, if the second data processing environment has conflict with the file imported from the system database 222, the populating module 216 may generate a warning message. In one aspect, the warning message may be displayed to the second user seeking conformation to update existing information in the pipeline being imported. In one aspect, the populating module 216 may populate the distributed computing pipeline over at least one of a monitor, a display screen, a mobile display and alike.

In one exemplary embodiment, the system 102 may enable the first user to export the pipeline designed in the first data processing environment and import the pipeline in the second data processing environment of the stream analytics platform. For example, the first user may design a pipeline in a production environment containing three computing machines. The first user may test the pipeline designed in the production environment to ensure that the desired output is obtained as a result of execution of the pipeline in an Apache® Storm® engine. The first user may then export the pipeline tested to a production environment containing fifty computing machines. Further, the first user may export the file comprising the messages, the message groups, the alerts, the custom components and the other configurations associated with the pipeline. The second user may then import the file and reuse the pipeline in order to execute the functions/tasks in the production environment.

In one example, the pipeline designed in the test environment may be exported as a file in the production environment. The file may act as a blueprint for the designing of new pipeline. Particularly, the system 102 may enable the first user to maintain the blue print of the pipeline with all the components and their configurations including messages, messages groups, message alerts, agent configurations, transformation variables, scope variables, user defined functions and registered components. It is to be understood that the file may maintain a manner in which the one or more of the components of the distributed computing pipeline are linked to each other.

In an exemplary embodiment, the first user may utilize an 'export' option provided on the GUI, of the first data processing environment, in order to export the pipeline for storage, share or reuse of the already designed pipeline in the form of the file. The second user may reuse the file, exported from the first data processing environment, using an 'import' option present on the GUI of the second data processing environment of the stream analytics platform. The import option enables the second user to upload the file and start working on the pipeline with minimal development efforts. The file exported from the first data processing environment may contain the following information:

Name and Structure of the Pipeline

Messages: List of all the messages which are used by the pipeline

Message Groups: List of all the message groups associated with the pipeline

Alerts: List of all the alerts associated with messages used by the pipeline.

Agent Configurations: List of all the agents associated with messages. The agent may be a machine readable instruction configured to read and push data from different sources to the stream analytics platform. The agent may also be configured to continuously fetch the data to be pushed Transformation variables: List of all the transformation variables used in the pipeline for analytics. The transformation variable may be used for a predictive model. The transformation variables may also explain a manner in which value of field in the message may be transformed to be used in predictive model.

Scope variables: List of all the scope variables used within the pipeline. The scope variables may be defined in a machine readable instruction to hold the value of field in the message.

User Defined Functions: List of all the functions used within the pipeline

Registered components: List of all the custom components registered by user and used within the pipeline.

In an aspect, when the second user imports the file, the aforementioned information is populated over the GUI of the second data processing environment of the system 102. Further the system 102 may display a warning message, if the second data processing environment already has a conflict with the aforementioned information, to the second user. In case of conflict, the system 102 may seek a confirmation from the second user to over-write the existing information with the information present in the pipeline being exported. Thus, the exporting/importing of the pipelines facilities the reusability of the pipelines amongst different data processing environments.

In another aspect, the system 102 may enable the second user to reconfigure the following while reusing the pipelines:

Name and structure of the pipeline: The second user may rename the pipeline or add new components/remove old components.

Messages and message groups: The second user may reconfigure the messages and message groups by adding/removing the fields within a message.

Alerts, Agent Configurations, Transformation variables, Scope variables, user defined functions, and the components registered.

According to one embodiment of the present disclosure, it is to be understood that the second user may also be the first user operating in the second data processing environment of the stream analytics platform. It may also be noted that the stream analytics platform may be implemented over at least one of the Apache® Storm®, an Apache® Spark® and others.

Figure 4:
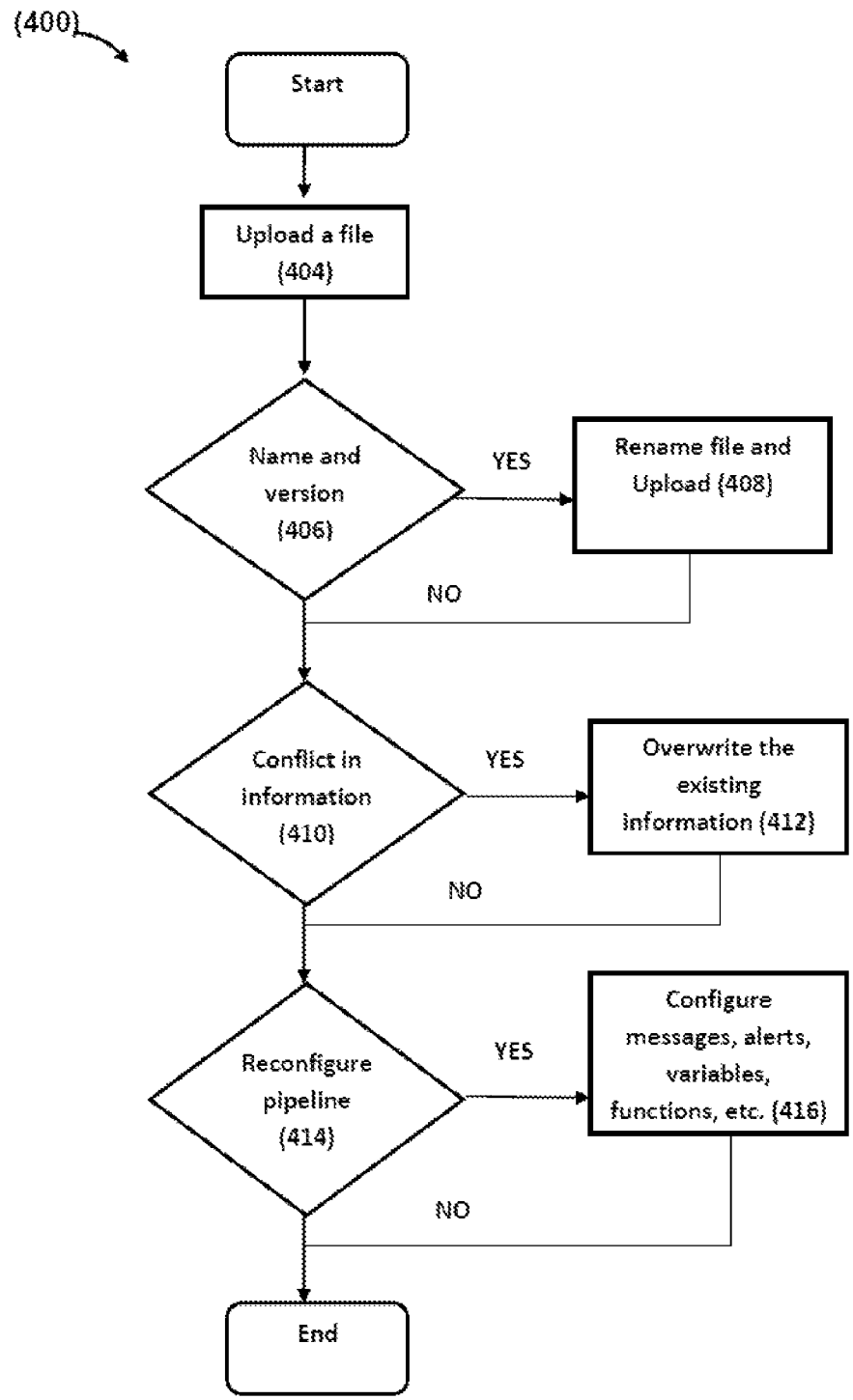
FIG. 4 illustrates a flow graph for importing the distributed computing pipeline, in accordance with an embodiment of the present subject matter.

FIG. 4 illustrates a flow graph 400 of an example for importing the distributed computing pipelines. Initially, at step 404, the system 102 may enable the second user to upload the file. The file is generated by the first user of the first data processing environment, using the "import" option provided by the import module 214. Subsequent to the upload of the file, at step 406, the system 102 may check the name and version of the file. When the name and the version of the file already exists in the second data processing environment, at step 408, the system 102 may display a message to rename the file name and upload the file again to the second data processing environment. Subsequent to the above step, at step 410, the system 102 may display a warning message if the pipeline is not compatible with the second data processing environment. At step 412, the system 102 may seek a confirmation from the second user to over-write configuration of the pipelines with the configuration present in the pipeline being imported. Subsequently at step 414, the system 102 may reconfigure the pipeline by configuring the one or more components of the data processing pipeline. Thus, the system 102 may enable the second user to reconfigure the components of the pipeline in the second data processing environment. In one aspect, the second user may update the pipeline and store the pipeline with a new version of the pipeline imported to the system 102. In one aspect, the pipeline designed by the first user may also be known as basic version of the pipeline. It may be understood that any modifications to the basic version of the pipelines may create the new version of the pipelines. The new version of the pipeline is also stored in the system database 222 in same folder as of the basic version of the pipeline.

Referring now to FIGS. 5a, 5b, 5c, 5d, 5e, and 5f, an example of the method for facilitating reusability of the distributed computing pipelines, in accordance with an embodiment of the present subject matter, is disclosed. Now referring to FIG. 5a, the system 102 may capture a distributed computing pipeline 500 designed by a first user, over a Graphical User Interface (GUI) of a first data processing environment associated with a stream analytics platform. The distributed computing pipeline 500 may be created using at least one of the components present over the GUI of the stream analytics platform. Further, the system 102 may display a list of available pipelines over the GUI of the stream analytics platform. Now referring to FIG. 5b, the first user may download the distributed computing pipeline 500 via "download" option 502 provided over the GUI. The pipeline 500 may be stored in the form of a file in the system database 222 of the system 102. The file may maintain a sequence in which the components are linked to each other. Once the pipeline 500 is stored, the first user may share the file containing configuration of the pipeline 500 to a second user operating in either the first data processing environment or a second data processing environment. Now referring to FIG. 5c, while importing the file, the second user may specify different versions 504 for the pipeline 500. Now referring to FIG. 5d, after importing the file, the system 102 may populate the distributed computing pipeline 500 over the GUI of the second data processing environment. The second user may update component 506 and pipeline level configurations of the distributed computing pipeline 500. Now referring to FIG. 5e, after updating the distributed computing pipeline 500, the system 102 may generate warnings 508 while importing the distributed computing pipeline 502. Further, the system may seek confirmation form the second user to perform at least one of a "over-write", a "create version" and a "new pipeline" function.

Figure 5A:
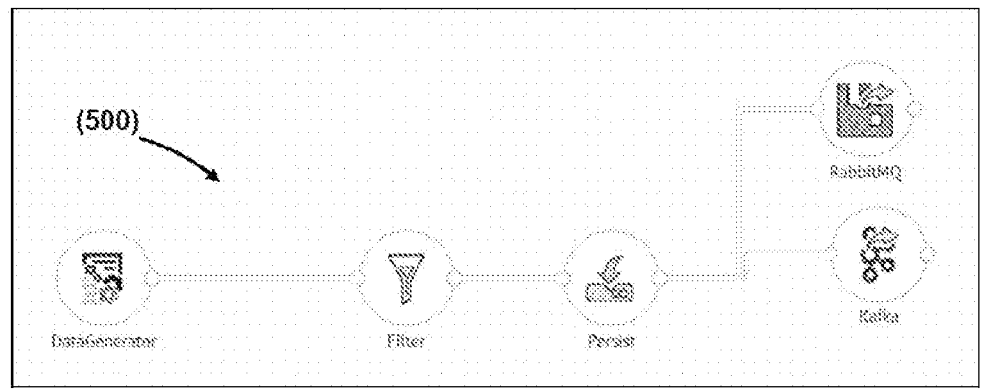
FIGS. 5a, 5b, 5c, 5d, 5e, and 5f illustrates an example of the method for facilitating reusability of the distributed computing pipelines, in accordance with an embodiment of the present subject matter.
Figure 5B:
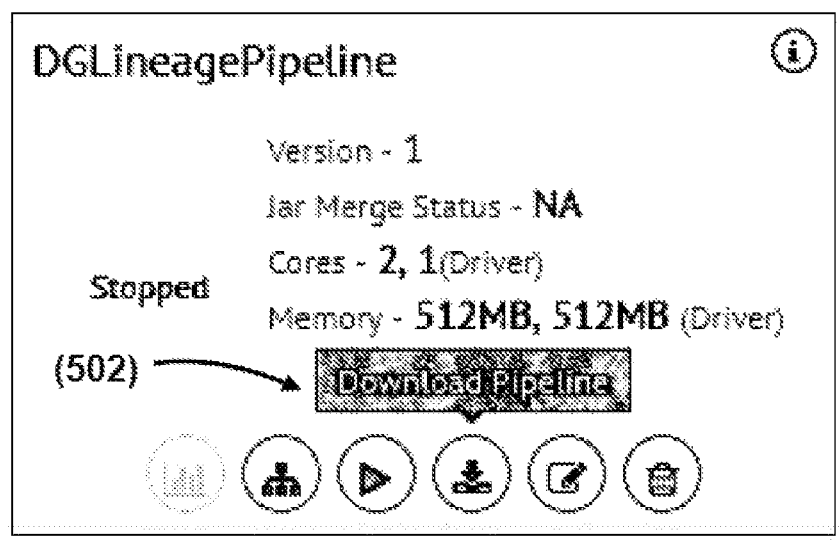
Figure 5C:
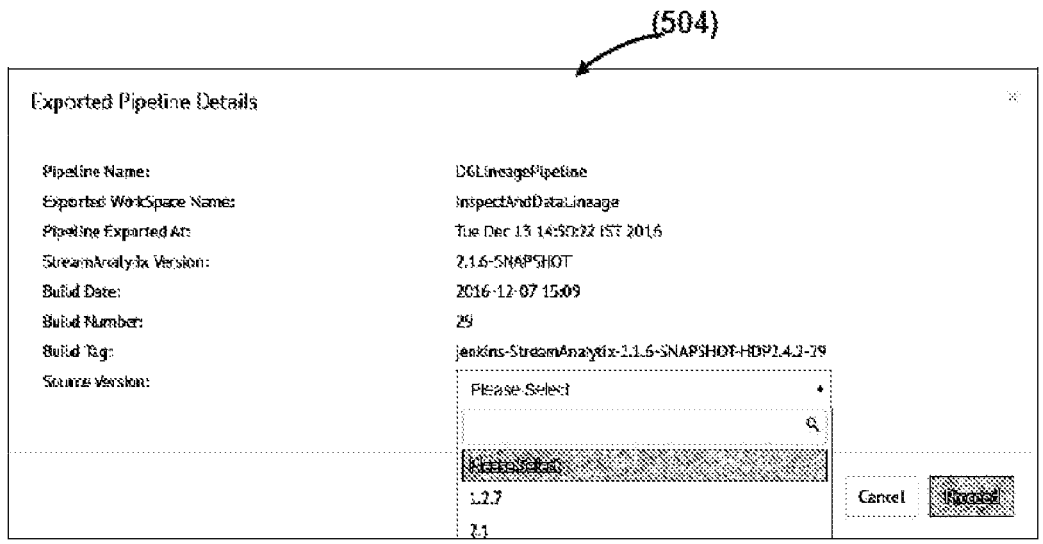
Figure 5D:
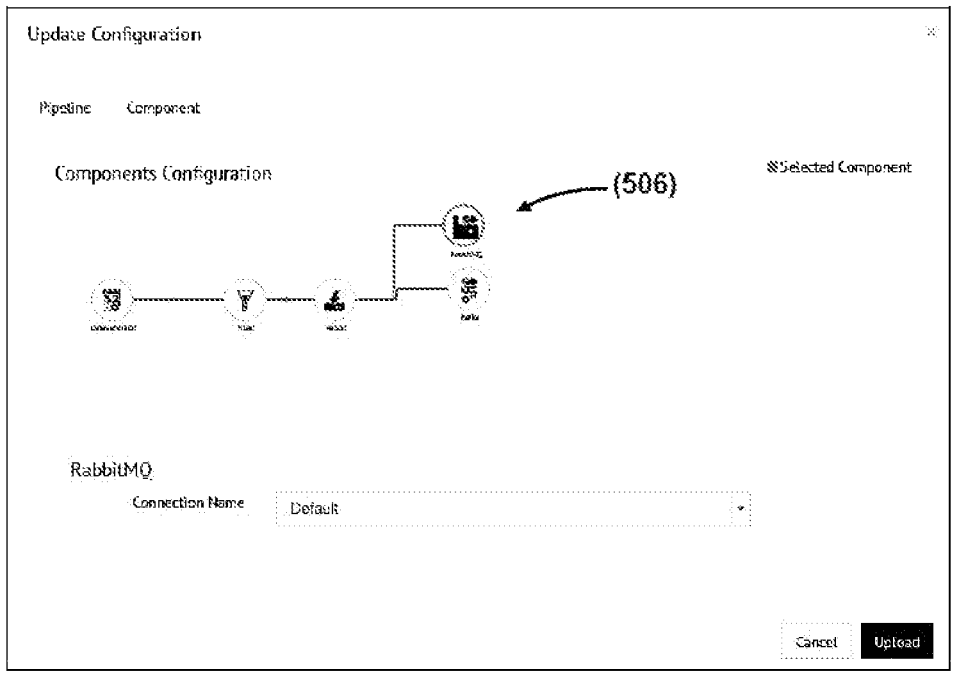
Figure 5E:
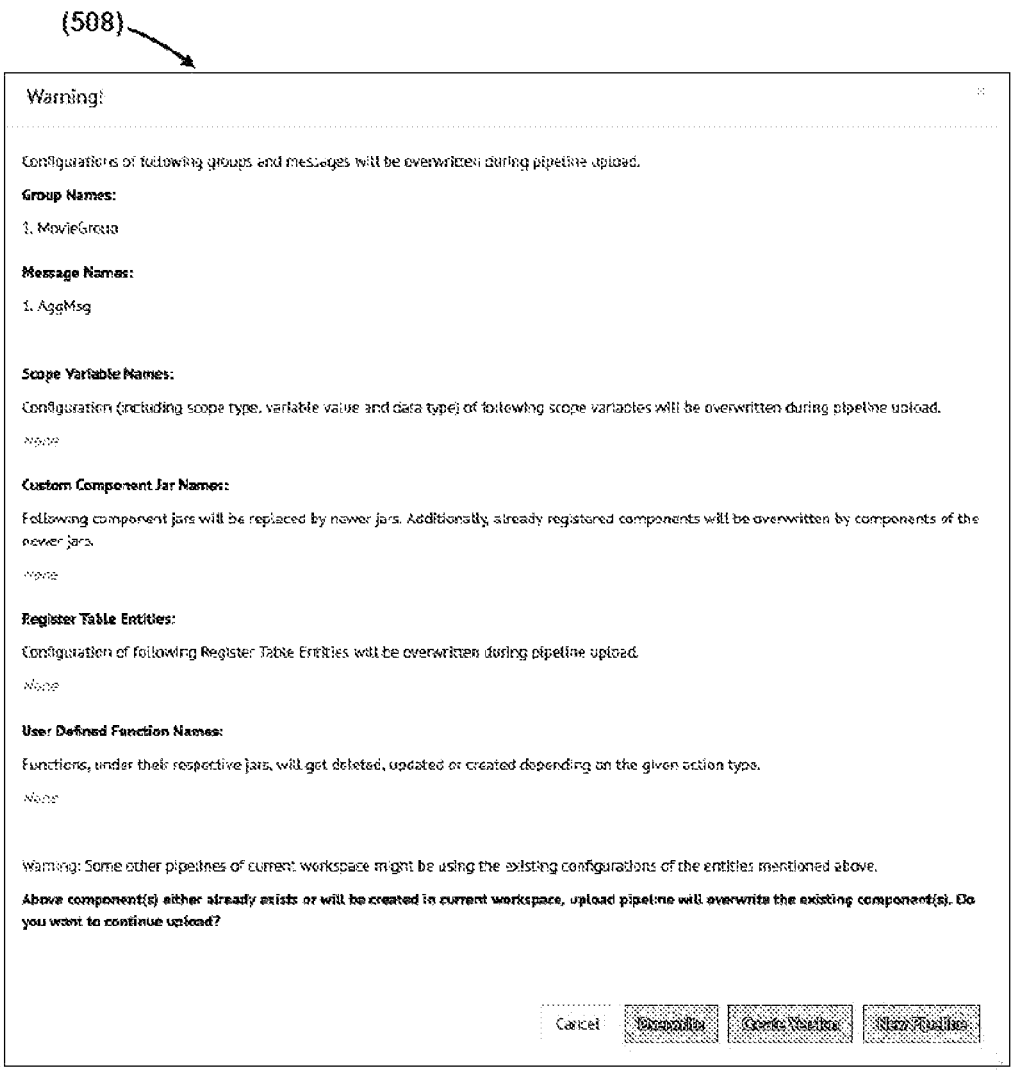
Figure 5F:
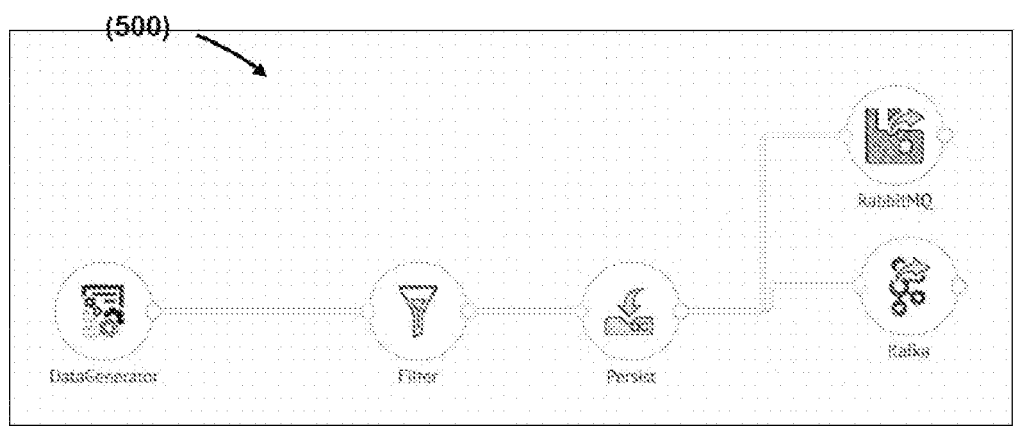

Now referring to FIG. 5f, once the distributed computing pipeline 500 is updated, the system 102 may populate the distributed computing pipeline 500 over the GUI of second data processing environment thereby facilitating the second user to reuse the distributed computing pipeline.

Although implementations for system and method for facilitating reusability of distributed computing pipelines have been described in language specific to structural features and/or methods, it is to be understood that the appended claims are not necessarily limited to the specific features or methods described.

The invention claimed is:

1. A method for facilitating reusability of distributed computing pipelines, the method comprising:
   capturing, by a processor, a set of versions pertaining to a distributed computing pipeline designed by a first user, over a Graphical User Interface (GUI), of a first data processing environment associated with a stream analytics platform, wherein each version indicates same or distinct business logic, and wherein the distributed computing pipeline comprises:
   a subset of components, selected by the first user from a universal set of components of the stream analytics platform, and
   a set of links corresponding to the subset of components;
   storing, by the processor, the distributed computing pipeline with the set of versions in a repository, wherein the distributed computing pipeline with the set of versions are stored in a file with a predefined file format pertaining to the stream analytics platform, wherein each version of pipeline is stored along with metadata associated with each version of the pipeline, wherein the file is configured to maintain components and configurations of the distributed computing pipeline comprising a name, a structure, messages, message groups, alerts, agent configurations, transformation variables, scope variables, wherein user defined functions and registered components enables the user for designing a new pipeline or modifying an existing pipeline, wherein the registered components have list of all the custom components registered by user;
   importing or exporting, by the processor, the file in a second data processing environment, wherein exporting or importing of the pipelines is done amongst different data processing environment by using at least one communication medium;
   verifying, by the processor, compatibility of the file in the second data processing environment, wherein the compatibility is verified by ensuring the predefined file format is conflict free for the second data processing environment;
   updating, by the processor, the file as per the second data processing environment when the file is in conflict with the second data processing environment; and
   populating, by the processor, a version of the distributed computing pipeline over the GUI of the second data processing environment, thereby facilitating the second user of the second data processing environment to reuse the distributed computing pipeline.

2. The method of claim 1 further comprises updating, by the processor, one or more components of the distributed computing pipeline to generate one or more versions corresponding to the distributed computing pipeline.

3. The method of claim 1, wherein the GUI comprises at least a canvas and a palette, wherein the palette is configured to display the universal set of components, and wherein the canvas enables the first user and the second user to drag and drop one or more components from the universal set of components for generating the distributed computing pipeline.

4. The method of claim 1, wherein the subset of components comprises of at least a channel component, a processor component, an enricher component and an emitter component.

5. A system for facilitating reusability of distributed computing pipelines, the system comprising:
   a processor; and
   a memory coupled to the processor, wherein the processor is capable of executing a plurality of modules stored in the memory, and wherein the plurality of modules comprising:
   a pipeline designing module is configured for capturing a set of versions pertaining to a distributed computing pipeline designed by a first user, over a Graphical User Interface (GUI) of a first data processing environment associated with a stream analytics platform, wherein each version indicates same or distinct business logic, and wherein the distributed computing pipeline comprises:
   a subset of components, selected by the first user of the data processing environment from a universal set of components of the stream analytics platform, and a set of links corresponding to the subset of components;
   an export module is configured for storing the distributed computing pipeline with the set of versions in a repository, wherein the distributed computing pipeline with the set of versions are stored in a file with a predefined file format pertaining to the stream analytics platform, wherein each version of pipeline is stored along with metadata associated with each version of the pipeline wherein the file is configured to maintain components and configurations of the distributed computing pipeline comprising a name, a structure, messages, message groups, alerts, agent configurations, transformation variables, scope variables, wherein user defined functions and registered components enables the user for designing a new pipeline or modifying an existing pipeline, wherein the registered components have list of all the custom components registered by user;
   an import module is configured for importing the file in a second data processing environment, wherein exporting or importing of the pipelines is done amongst different data processing environment;
   verifying compatibility of the file in the second data processing environment, wherein the compatibility is verified by ensuring the predefined file format is conflict free for the second data processing environment;
   updating the file as per the second data processing environment when the file is in conflict with the second data processing environment; and
   a populating module is configured for populating a version of the distributed computing pipeline over the GUI of the second data processing environment, thereby facilitating the second user of the second data processing environment to reuse the distributed computing pipeline.

6. The system of claim 5 further configured to update one or more components of the distributed computing pipeline to generate one or more versions corresponding to the distributed computing pipeline.

7. The system of claim 5, wherein GUI comprises at least a canvas and a palette, wherein the palette is configured to display the universal set of components, and wherein the canvas enables the first user and the second user to drag and drop one or more components from the universal set of components for generating the distributed computing pipeline.

8. The system of claim 5, wherein the subset of components comprises of at least a channel component, a processor component, an enricher component and an emitter component.

9. A non-transitory computer readable medium embodying a program executable in a computing device for facilitating reusability of distributed computing pipelines, the program comprising a program code:
a program code for capturing a set of versions pertaining to a distributed computing pipeline designed by a first user, over a Graphical User Interface (GUI), of a first data processing environment associated with a stream analytics platform, wherein each version indicates same or distinct business logic, and wherein the distributed computing pipeline comprises:
a subset of components, selected by the first user of the data processing environment from a universal set of components of the stream analytics platform, and
a set of links corresponding to the subset of components;
a program code for storing the distributed computing pipeline with the set of versions in a repository, wherein the distributed computing pipeline with the set of versions are stored in a file with a predefined file format pertaining to the stream analytics platform, wherein each version of pipeline is stored along with metadata associated with each version of the pipeline wherein the file is configured to maintain components and configurations of the distributed computing pipeline comprising a name, a structure, messages, message groups, alerts, agent configurations, transformation variables, scope variables, wherein user defined functions and registered components enables the user for designing a new pipeline or modifying an existing pipeline, wherein the registered components have list of all the custom components registered by user;
a program code for importing the file in a second data processing environment, wherein exporting or importing of the pipelines is done amongst different data processing environment;
a program code for verifying compatibility of the file in the second data processing environment, wherein the compatibility is verified by ensuring the predefined file format is conflict free for the second data processing environment;
a program code for updating the file as per the second data processing environment when the file is in conflict with the second data processing environment; and
a program code for populating a version of the distributed computing pipeline over the GUI of the second data processing environment, thereby facilitating the second user of the second data processing environment to reuse the distributed computing pipeline.

10. The method of claim 1 further comprises displaying warning message when the file is in conflict with the second data processing environment.

11. The system of claim 5 further comprises displaying warning message when the file is in conflict with the second data processing environment.

12. The method of claim 1, wherein the first data processing environment and the second data processing environment work independently and individually, and wherein the first data processing environment or the second data processing environment is one of a pre-production environment, a production environment, a test environment, and a development environment, and wherein the first data processing environment and the second data processing environment are either in same network or distinct network.

13. The system of claim 5, wherein the first data processing environment and the second data processing environment work independently and individually, and wherein the first data processing environment or the second data processing environment is one of a pre-production environment, a production environment, a test environment, and a development environment, and wherein the first data processing environment and the second data processing environment are either in same network or distinct network.

14. The method of claim 1, wherein each version of the set of versions is having one or more folders created in the system database capable of storing the pipeline and metadata pertaining to each version of the distributed computing pipeline, wherein each folder is identified by a unique name and a unique version number, and wherein each folder stores pipeline definition in a predefined file format.

15. The system of claim 5, wherein each version set of versions is having one or more folders created in the system database capable of storing the business logic and metadata pertaining to the distributed computing pipeline, wherein each folder is identified by a unique name and a unique version number, and wherein each folder stores pipeline definition in a predefined file format.

* * * * *